(12) United States Patent
Sugahara

(10) Patent No.: US 7,605,827 B2
(45) Date of Patent: Oct. 20, 2009

(54) DISPLAY PROCESSING APPARATUS

(75) Inventor: Kazuhiko Sugahara, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 463 days.

(21) Appl. No.: 11/072,248

(22) Filed: Mar. 7, 2005

(65) Prior Publication Data

US 2005/0195222 A1    Sep. 8, 2005

(30) Foreign Application Priority Data

Mar. 5, 2004   (JP)  ............................. 2004-062843

(51) Int. Cl.
    G09G 5/00  (2006.01)
(52) U.S. Cl. ...................... 345/684; 715/784
(58) Field of Classification Search ................. 715/526, 715/517, 784; 345/684, 467, 171, 168
    See application file for complete search history.

(56) References Cited

U.S. PATENT DOCUMENTS

| | | | | |
|---|---|---|---|---|
| 5,371,846 A | * | 12/1994 | Bates | ......................... 715/786 |
| 5,757,381 A | * | 5/1998 | Shoji et al. | .................. 345/684 |
| 5,873,110 A | * | 2/1999 | Toyosawa et al. | ........... 715/209 |
| 6,141,018 A | * | 10/2000 | Beri et al. | .................... 345/473 |
| 6,384,845 B1 | * | 5/2002 | Takaike | ...................... 715/786 |
| 6,515,656 B1 | * | 2/2003 | Wittenburg et al. | ......... 345/418 |
| 2004/0141009 A1 | * | 7/2004 | Hinckley et al. | ............ 345/786 |

FOREIGN PATENT DOCUMENTS

| | | |
|---|---|---|
| JP | 5-210654 A | 8/1993 |
| JP | 11-74960 | 3/1999 |
| JP | 2003-345333 | 12/2003 |

* cited by examiner

*Primary Examiner*—William L Bashore
*Assistant Examiner*—Daeho D Song
(74) *Attorney, Agent, or Firm*—Sughrue Mion, PLLC

(57) ABSTRACT

According to the display processing apparatus of the present invention, when an instruction to perform scrolling and displaying of information terminates, the information is returned by a predetermined scroll amount in the reverse direction of the scrolling and displaying direction. That is, although the user-desired information has passed the display range on the display device while scrolling, the information is returned by a predetermined amount. As a result, it is not necessary for the user to return all the way to the desired candidate.

14 Claims, 5 Drawing Sheets

| INITIAL SCROLL SPEED | HIGH SCROLL SPEED | AMOUNT OF RETURN | CONTINUOUS PRESS TIME |
|---|---|---|---|
| 1 DOT/SEC | 2 DOTS/SEC | 1 ORDER | 1 SEC |

FIG.2

| CHARACTERS SHOWING THE READING | CONVERSION CANDIDATE FOR KANJI/DISPLAY ORDER | | | | | | | | | |
|---|---|---|---|---|---|---|---|---|---|---|
| | 1 | | 2 | | 2 | | 2 | | 2 | |
| KOUKAI | "PUBLISH (KOUKAI)" | | "OPEN SEA (KOUKAI)" | | "SAIL (KOUKAI)" | | "REGRET (KOUKAI)" | | "NOVATION (KOUKAI)" | |
| ... | | | | | | | | | | |

FIG.5

| INITIAL SCROLL SPEED | HIGH SCROLL SPEED | AMOUNT OF RETURN | CONTINUOUS PRESS TIME |
|---|---|---|---|
| 1 DOT/SEC | 2 DOTS/SEC | 1 ORDER | 1 SEC |

DISPLAY PROCESSING APPARATUS

BACKGROUND OF THE INVENTION

1. Field of the Invention

The present invention relates to an apparatus for scrolling and displaying information such as characters, images, etc. on the display device.

2. Description of the Related Art

Conventionally, various techniques have been developed to allow a user to easily select display contents. For example, according to Japanese Patent Application Laid-open No. 5-210654, it is determined whether the data input from an input device is a character string to be converted to kanji or data for indicating the display of another conversion candidate using up, down, left, and right keys. If the data is a character string to be converted to kanji, conversion candidates are displayed on the display device, and the leftmost conversion candidate character string is highlighted in reverse video, etc. If the data indicates the display of another conversion candidate, the reverse is moved on the display device depending on the up, down, left, and right keys. When a reverse is located at the end of the conversion candidates, the conversion candidates being displayed are advanced (hereinafter referred to as scroll).

SUMMARY OF THE INVENTION

In the technology of Japanese Patent Application Laid-open No. 5-210654, it is necessary to continuously scroll the conversion candidates depending on the operation of the up, down, left, and right keys until desired conversion candidates appear. However, when the display range of the display device is limited or there are a number of conversion candidates, a long time is taken to continue scrolling data until a desired conversion candidate is detected. Furthermore, after scrolling data, it is probable that a user-desired candidate has passed, and therefore, the data has to be scrolled back until the user desired candidate is obtained. To solve these problems, the present invention aims at appropriately scrolling and selecting a candidate.

The first aspect of the present invention provides a display processing apparatus, comprising: a display device; a storage device which stores information to be displayed on the display device; an input device which accepts input of an instruction to perform scrolling and displaying the information; and a display control device which scrolls and displays the information in a predetermined direction at the instruction, wherein the display control device displays information, after the instruction, returned by a predetermined scroll amount in an opposite direction of the predetermined direction.

According to the invention, when an instruction to perform scrolling and displaying of information terminates, the information is returned by a predetermined scroll amount in the reverse direction of the scrolling and displaying direction. That is, although the user-desired information has passed the display range on the display device while scrolling, the information is returned by a predetermined amount. As a result, it is not necessary for the user to return all the way to the desired candidate.

The second aspect of the present invention provides the display processing apparatus according to the first aspect, wherein the display control device increases a speed of the scrolling and displaying when the instruction is continuously input for a predetermined time.

The third aspect of the present invention provides the display processing apparatus according to the second aspect, wherein the storage device stores a first speed which is a scrolling and displaying speed, and a second speed which is a scrolling and displaying speed faster than the first speed; and the display control device allows the information to be scrolled and displayed at the first speed in a predetermined direction at the instruction, and switches the speed of the scrolling and displaying from the first speed to the second speed when the instruction is continuously input for a predetermined time.

The fourth aspect of the present invention provides the display processing apparatus according to one of the first to third aspects, wherein the storage device stores the predetermined scroll amount; the input device accepts selection of desired information from the information displayed on the display device; and the display control device calculates an amount of scrolling and displaying from information displayed at termination point of the instruction to the selected information, and an average of the predetermined scroll amount and the amount of scrolling is updated and stored as a new predetermined scroll amount in the storage device.

The fifth aspect of the present invention provides the display processing apparatus based on the one of the first to fourth aspects, wherein the input device accepts the direction of the scrolling and displaying; and the display control device allows the information to be scrolled and displayed in the accepted direction.

According to the above-mentioned invention, when an instruction to perform scrolling and displaying of information terminates, the information is returned by a predetermined amount in the reverse direction of the scrolling and displaying direction. That is, although the user-desired information has passed the display range on the display device while scrolling, the information is returned by a predetermined amount. As a result, it is not necessary for the user to return all the way to the desired candidate.

BRIEF DESCRIPTION OF THE DRAWINGS

FIG. 2 shows the concept of display data;

FIG. 5 shows the concept of the scroll control data.

DETAILED DESCRIPTION OF THE PREFERRED EMBODIMENTS

The preferred embodiments of the present invention are explained below by referring to the attached drawings.

Embodiment 1

Figure 1:
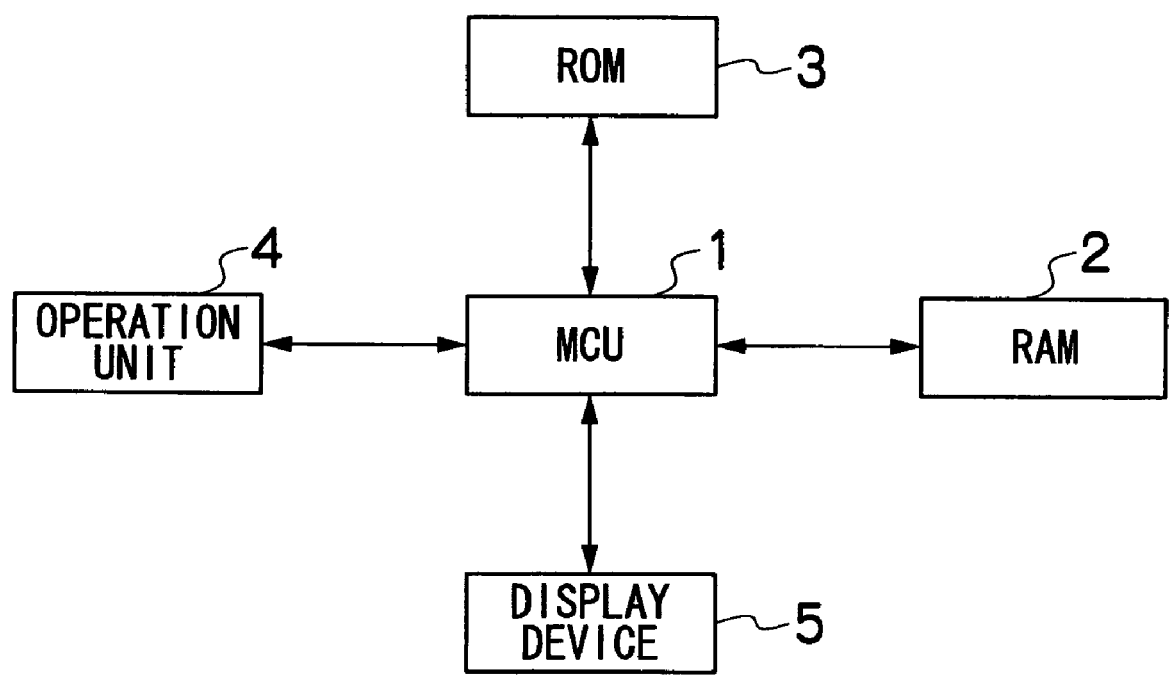
FIG. 1 shows the rough configuration of the display processing apparatus according to the preferred embodiment of the present invention.

FIG. 1 is a block diagram of the configuration of the display processing apparatus according to a preferred embodiment of the present invention. The apparatus comprises a microcontroller unit (MCU) 1, RAM 2, ROM 3, an operation unit 4, and a display device 5.

The display device 5 is a well-known display device such as a liquid crystal display panel, etc. The operation unit 4 has user operable operation buttons and receives various operation input. The ROM 3 stores data in which characters and other information to be displayed on the display device 5 are prescribed by dots. The ROM 3 can be rewritable EEPROM, and the storage contents can be updated. According to the present embodiment, as shown in FIG. 2, the ROM 3 stores data for displaying characters showing the reading input from the operation unit 4, and the data for displaying homonyms corresponding to the characters showing the reading as conversion candidates for kanji. The data is referred to as display data. Each conversion candidate for kanji is assigned a display order. Obviously, the ROM 3 can store a character other than kana and kanji, for example, reading katakana can correspond to one or more alphabetical word.

Figure 3A:
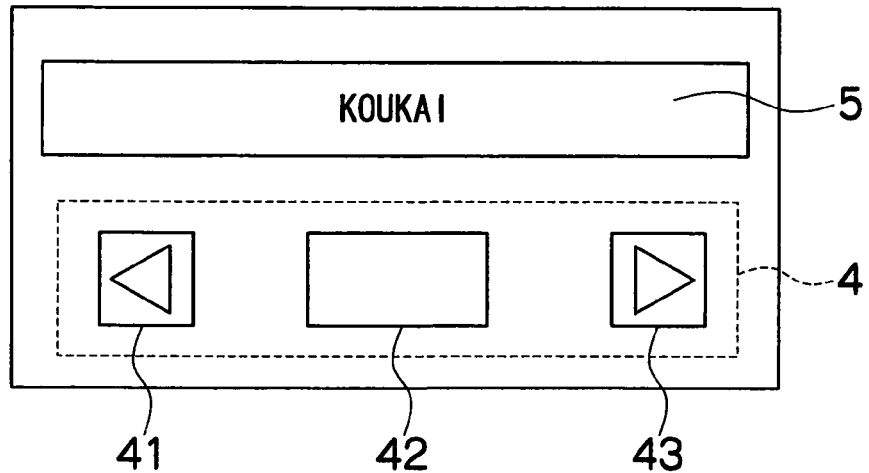
FIGS. 3A to 3C show the appearance of the display processing apparatus.

As shown in FIG. 3A, the operation unit 4 comprises a left scroll button 41, a determination button 42, and a right scroll button 43. The left scroll button 41 and the right scroll button 43 are collectively called scroll buttons. Although an input button for characters showing the reading is not shown in the attached drawings, for example, keys similar to those on the well-known 50-reading-character keyboard can be provided for the operation unit 4, thereby inputting characters showing the reading.

Figure 4:
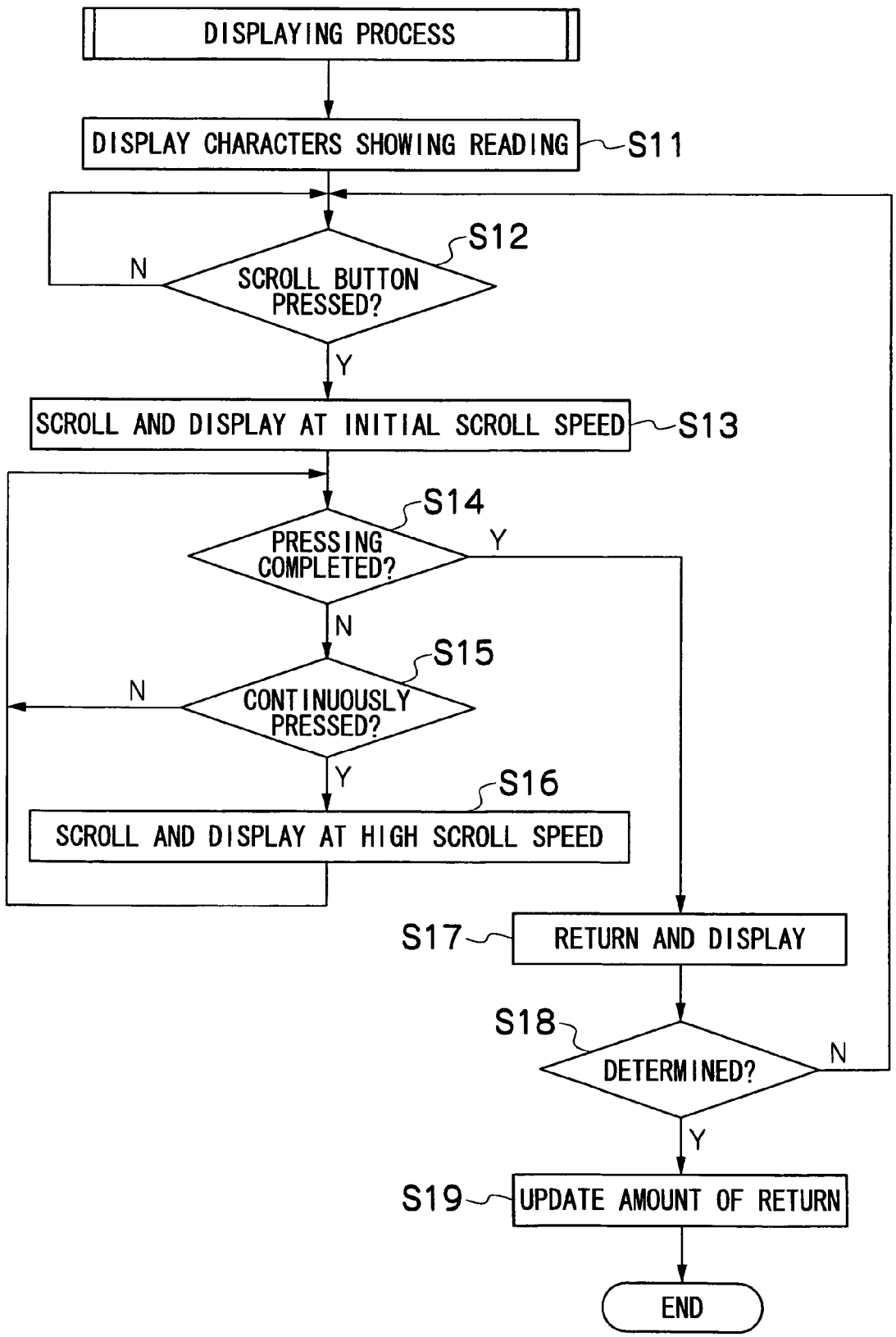
FIG. 4 is a flowchart showing the flow of the displaying process.

Then, the displaying process performed by the MCU 1 is explained below by referring to the flowchart shown in FIG. 4.

In the present embodiment, the Japanese word "koukai" is used as an example of homonyms. In the example given below, "publish", "open sea", "sail", "regret" and "novation" are the homonyms in Japanese. That is, all of them can be read as "koukai" in Japanese.

In S11, the MCU 1 reads from the ROM 3 the data for prescribing the characters showing the reading input from the operation unit 4, the data for prescribing the conversion candidate for kanji corresponding to the characters showing the reading and their display orders, and stores them in the RAM 2, and displays the characters showing the reading on the display device 5. For example, when the characters showing the reading "kokai" is input in the operation of the operation unit 4, as shown in FIG. 3A, the characters showing the reading "kokai" are displayed on the display device 5. The display range of the display device 5 is as small as a space for display of one row of characters showing the reading.

Figure 3B:
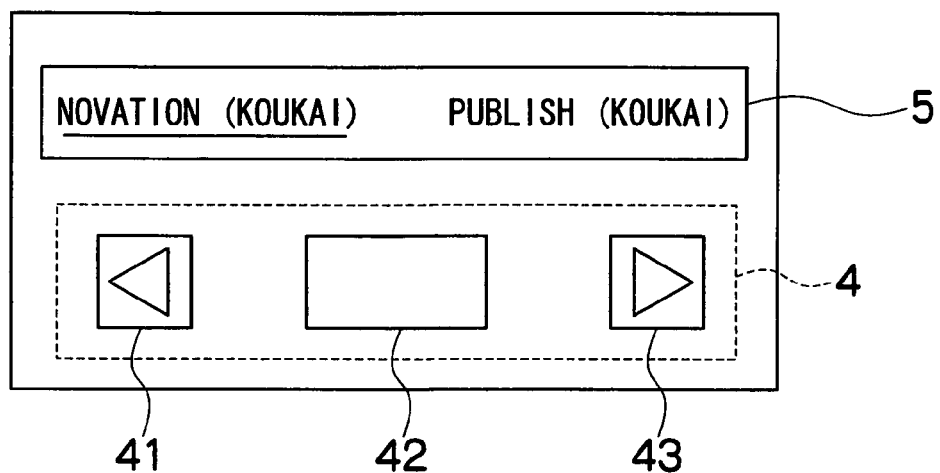
Figure 3C:
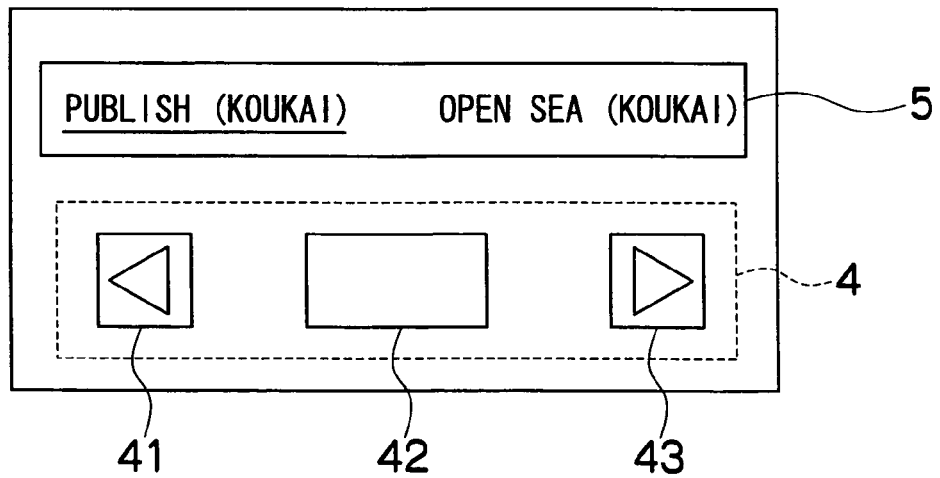

In S12, the MCU 1 determines whether or not the scroll button has been operated. When the scroll button is operated, control is passed to step S13. If there is no operation, an operation is continuously awaited. In S13, a conversion candidate for kanji corresponding to the characters showing the reading displayed on the display device 5 are displayed on the display device 5 in the display order of the RAM 2 by the operation of the left scroll button 41 or the right scroll button 43. For example, if "kokai" is displayed on the display device 5, and the left scroll button 41 is pressed, then "publish (koukai)" having the display order "1" is first displayed on the display device 5 as shown in FIG. 3B. Afterwards, when the left scroll button 41 is pressed, the conversion candidates for kanji are scrolled and displayed on the display device 5 in the display order "5", "4", "3", "2", and "1". Otherwise, when the right scroll button 43 is pressed, as shown in FIG. 3C, "publish" having the display order "1" is first displayed. Then, if the right scroll button 43 is continuously pressed, the conversion candidates for kanji are scrolled and displayed on the display device 5 in the display order "2", "3", "4", "5", and "1". As shown in FIGS. 3B and 3C, the conversion candidates for kanji displayed at the leftmost position of the display device 5 are underlined. The underline can be moved under any conversion candidate for kanji in the conversion candidates for kanji displayed on the display device 5 by operating the scroll button and other various operation buttons provided on the operation unit 4. By pressing the determination button 42, the conversion candidate for kanji above the underline can be defined and selected as a conversion candidate for characters showing the reading.

As shown in FIG. 5, the ROM 3 stores two levels of scrolling and displaying speed, that is, an initial scroll speed and a high scroll speed, and also stores an amount of return and a continuous press time. Hereinafter, the data is referred to as scroll control data. When the scroll button is first pressed after displaying the characters showing the reading ("Y" in S12), the MCU 1 scrolls the conversion candidates for kanji at the initial scroll speed. For example, since the initial scroll speed shown in FIG. 4 is 1 dot/sec., the MCU 1 right or left shifts and displays a conversion candidate for kanji at 1 dot per second. The scroll direction is left when the left scroll button 41 is pressed, and right when the right scroll button 43 is pressed. The values of the initial scroll speed, the high scroll speed, the amount of return, and the continuous press time can be appropriately changed depending on the operation unit 4. Furthermore, the units of the initial scroll speed, the high scroll speed, the amount of return are not limited to those shown in FIG. 5. For example, the amount of return shown in FIG. 5 is a portion of the display order of the conversion candidate for kanji prescribed as shown in FIG. 2, but can be the number of dots.

In S14, it is determined whether or not the same scroll button is continuously pressed. If the same scroll button is continuously pressed, control is passed to S15, and when the same scroll button stops the pressing, control is passed to S17. In S15, it is determined whether or not the same scroll button is being continuously pressed in excess of the continuous press time when a conversion candidate for kanji is scrolled and displayed at the initial scroll speed. If the same scroll button is being continuously pressed in excess of the continuous press time, control is passed to S16. If the continuous press time has not reached the continuous press time, control is returned to S14.

In S16, the MCU 1 scrolls conversion candidates for kanji at the high scroll speed. For example, since the high scroll speed shown in FIG. 4 is 2 dots/sec., the MCU 1 shifts and displays conversion candidates for kanji two dots per second. That is, if the scroll button is continuously pressed in excess of continuous press time, then the conversion candidates for kanji being shifted and displayed at the initial scroll speed are shifted and displayed at the high scroll speed, thereby increasing the shift speed in scrolling. The MCU 1 continues the process in S14 to S16 until the continuous press of the same scroll button terminates ("Y" in S14).

In S17, when the continuous press of the scroll button terminates, the MCU 1 stops scroll and display of conversion candidates for kanji, and displays conversion candidates for kanji by returning the current conversion candidates for kanji by the amount of return in the opposite direction of the scroll direction of the shift and display at the high scroll speed. For example, since the amount of return shown in FIG. 4 is a portion of the display order, the MCU 1 returns the conversion candidates for kanji by a portion of the display order in the opposite direction of the current scroll direction. In S18, the MCU 1 accepts the shift of the underline by the operation of the operation unit 4, and determines whether or not the determination button 42 has been pressed. If the determination button 42 has been pressed, control is passed to S19. If the determination button 42 has not been pressed, control is returned to S12.

In S19, MCU 1 calculates the distance between the conversion candidate for kanji (referred to as a first kanji candidate) displayed above the underline when it is determined that pressing the same scroll button has been completed in S14 and the conversion candidate for kanji (referred to as a second kanji candidate) displayed above the underline when it is determined that the determination button 42 has been pressed. The distance is defined as the absolute value of the difference between the display order of the first kanji candidate and the display order of the second kanji candidate. For example, when the first kanji candidate is "novation (koukai)", and the second kanji candidate is "publish (koukai)", the distance is 5−1=4. Otherwise, when the first kanji candidate is "sail (koukai)", and the second kanji candidate is "regret (koukai)", the distance is |3−4|=1. The MCU 1 calculates an average value of the amount of return and the distance stored in the ROM 3, and stores the average value in the ROM 3 as a new amount of return. That is, although there is a difference between the conversion candidate shifted and displayed by an amount of return by the MCU 1 and the actually determined and selected conversion candidate, the amount of return is corrected by the average value of the display order, and the optimum amount of return can be learned as the user continues the process.

Embodiment 2

The display data stored in the ROM 3 can be other than characters as in the embodiment 1. For example, various information such as a stationary image or moving picture to which a unique display order is assigned can be used. In this case, in the displaying process in the embodiment 1, the process in S11 can be omitted.

What is claimed is:

1. A display processing apparatus, comprising:
  a display device;
  a storage device which stores information to be displayed on the display device;
  an input device which accepts input of an instruction to perform scrolling and displaying the information; and
  a display control device which scrolls and displays the information in a predetermined direction at the instruction,
  wherein the display control device displays information, directly after the instruction, returned by a predetermined scroll amount in an opposite direction of the predetermined direction without further input to the input device;
  wherein the return is automatically performed in response to the end of the instruction;
  the storage device stores the predetermined scroll amount;
  the input device accepts selection of desired information from the information displayed on the display device; and
  the display control device calculates an amount of scrolling and displaying from information displayed at termination point of the instructions to the selected information, and an average of the predetermined scroll amount and the amount of scrolling is updated and stored as a new predetermined scroll amount in the storage device.

2. The display processing apparatus according to claim 1, wherein the display control device increases a speed of the scrolling and displaying when the instruction is continuously input for a predetermined time.

3. The display processing apparatus according to claim 2, wherein:
  the storage device stores a first speed which is a scrolling and displaying speed, and a second speed which is a scrolling and displaying speed faster than the first speed; and
  the display control device allows the information to be scrolled and displayed at the first speed in a predetermined direction at the instruction, and switches the speed of the scrolling and displaying from the first speed to the second speed when the instruction is continuously input for a predetermined time.

4. The display processing apparatus according to claim 2, wherein:
  the storage device stores the predetermined scroll amount;
  the input device accepts selection of desired information from the information displayed on die display device; and
  the display control device calculates an moat of scrolling and displaying from information displayed at termination point of the instruction to the selected information, and an average of the predetermined scroll mount and the amount of scrolling is updated and stored as a new predetermined scroll moat in the storage device.

5. The display processing apparatus according to claim 3, wherein:
  the storage device stores the predetermined scroll amount;
  the input device accepts selection of desired information from the information displayed on the display device; and
  the display control device calculates an amount of scrolling and displaying from information displayed at termination point of the instruction to the selected information, and an average of the predetermined scroll amount and the amount of scrolling is updated and stored as a new predetermined scroll amount in the storage device.

6. The display processing apparatus according to claim 1, wherein:
  the input device accepts the direction of the scrolling and displaying; and
  the display control device allows the information to be scrolled and displayed in the accepted direction.

7. The display processing apparatus according to claim 2, wherein:
  the input device accepts the direction of the scrolling and displaying; and
  the display control device allows the information to be scrolled and displayed in the accepted direction.

8. The display processing apparatus according to claim 3, wherein:
  the input device accepts the direction of the scrolling and displaying; and
  the display control device allows the information to be scrolled and displayed in the accepted direction.

9. The display processing apparatus according to claim 1, wherein:
  the input device accepts the direction of the scrolling and displaying; and
  the display control device allows the information to be scrolled and displayed in the accepted direction.

10. The display processing apparatus according to claim 4, wherein:
  the input device accepts die direction of the scrolling and displaying; and
  the display control device allows the information to be scrolled and displayed in the accepted direction.

11. The display processing apparatus according to claim 5, wherein:
  the input device accepts the direction of the scrolling and displaying; and
  the display control device allows the information to be scrolled and displayed in the accepted direction.

12. The display processing apparatus according to claim 3, wherein:

the display control device allows the information to be scrolled and displayed at the first speed in a predetermined direction at the instruction, and switches the speed of the scrolling and displaying from the first speed to the second speed automatically when the instruction is continuously input for a predetermined time.

13. The display processing apparatus according to claim 3, wherein:

the display control device allows the information to he scrolled and displayed at the first speed in a predetermined direction at the instruction, and switches the speed of the scrolling and displaying from the first speed to the second speed, without further input to the input device, when the instruction is continuously input for a predetermined time.

14. The display processing apparatus according to claim 3, wherein:

the display control device allows the information to be scrolled and displayed at the first speed in a predetermined direction at the instruction, and switches the speed of the scrolling and displaying from the first speed to the second speed when the instruction is continuously input for a predetermined time without additional input to the input device.

* * * * *